United States Patent [19]

Akiyama et al.

[11] 4,399,087
[45] Aug. 16, 1983

[54] PROCESS FOR PRODUCING FOAMED POLYOLEFIN ARTICLES FROM AGED PRE-FOAMED PARTICLES OF POLYOLEFIN RESINS

[75] Inventors: Hiroyuki Akiyama, Hiratsuka; Susumu Izawa, Utsunomiya; Kuninori Hirosawa, Isehara; Hideharu Inada, Hiratsuka, all of Japan

[73] Assignee: Japan Styrene Paper Corporation, Tokyo, Japan

[21] Appl. No.: 275,620

[22] Filed: Jun. 22, 1981

[30] Foreign Application Priority Data

Jun. 25, 1980 [JP] Japan .................................. 55-86093

[51] Int. Cl.³ ............................................. B29D 27/00
[52] U.S. Cl. ................................ 264/53; 264/DIG. 5; 264/DIG. 15; 264/DIG. 16; 264/DIG. 18; 521/56; 521/60
[58] Field of Search .......... 264/53, DIG. 5, DIG. 15, 264/DIG. 16, DIG. 18; 521/56, 60

[56] References Cited

U.S. PATENT DOCUMENTS

| 3,725,320 | 4/1973 | Wang ........................ 264/DIG. 15 |
| 3,755,518 | 8/1973 | Stastny et al. .................... 264/53 X |
| 3,840,628 | 10/1974 | Stastny et al. .................... 264/53 X |
| 4,108,934 | 8/1978 | Rubens et al. ........................ 264/53 |
| 4,275,023 | 6/1981 | Shimizu et al. .................. 264/53 X |

FOREIGN PATENT DOCUMENTS 51-22951  7/1976  Japan .

Primary Examiner—Philip E. Anderson
Attorney, Agent, or Firm—Wenderoth, Lind & Ponack

[57] ABSTRACT

In a process for producing a foamed article of a polyolefin resin which comprises filling in a mold pre-foamed particles of a polyolefin resin containing a gaseous mixture consisting of an inorganic gas and a volatile organic blowing agent in their cells and heating them to mold a foamed article; the improvement wherein the pre-foamed particles of the resin are those in which the total pressure of the gaseous mixture is 1.4 to 2.5 kg/cm² (abs.), with the partial pressure of the inorganic gas being maintained at 0.4 to 1.1 kg/cm² (abs.) and the partial pressure of the volatile blowing agent at 0.8 to 1.6 kg/cm² (abs.).

6 Claims, 1 Drawing Figure

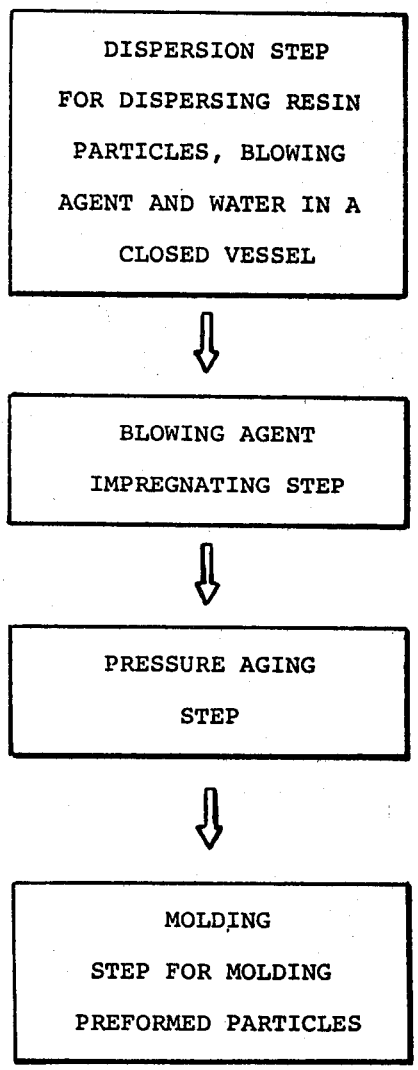

PROCESS FOR PRODUCING FOAMED POLYOLEFIN ARTICLES FROM AGED PRE-FOAMED PARTICLES OF POLYOLEFIN RESINS

BACKGROUND OF THE INVENTION

1. Field of the Invention

This invention relates to a process for producing a foamed article from pre-foamed particles of a polyolefin resin.

2. Description of the Prior Art

Some methods have been proposed in the past which comprise crosslinking and pre-foaming a polyolefin resin as a base resin to produce pre-foamed crosslinked polyolefin particles, filling the pre-foamed particles in a mold, and expanding them by heating, thereby to obtain a molded article having the same configuration as the mold. For example, Japanese Patent Publication No. 22951/1976 discloses a method which comprises keeping pre-foamed particles of a polyolefin resin for a predetermined period of time in an inorganic gas, such as air, maintained at a high pressure to include the inorganic gas at a pressure of at least 1.18 atmospheres within the particles, filling the particles in a mold, and expanding them under heat. This method, however, has the disadvantage that when a foamed article having a large thickness is produced by using this known method, adhesion among particles in the inside of the foamed article becomes poor and the quality of the product is not satisfactory. Furthermore, this known method can be applied only to those polyolefin resins which have a low softening temperature, for example low-density polyethylene, and this leads to the defect that when this method is applied to a resin having a high softening temperature such as polypropylene, the resulting product has poor adhesion not only at its core portion but also at its surface layer portion.

SUMMARY OF THE INVENTION

It is an object of this invention therefore to overcome the aforesaid disadvantages of the prior art, and to provide a foamed article having a well adhered core portion by using pre-foamed particles of a polyolefin resin.

Another object of this invention is to provide a process for producing a foamed article, which can be applied to a broad range of polyolefin resins having from a low softening temperature to a high softening temperature.

These objects are achieved in accordance with this invention by an improved process for producing a foamed article of a polyolefin resin, which comprises filling in a mold, pre-foamed particles of a polyolefin resin containing a gaseous mixture of an inorganic gas and a volatile organic blowing agent in their cells, and heating the pre-foamed particles to give a foamed article, the improvement being that the total pressure of the gaseous mixture in the pre-foamed particles is 1.4 to 2.5 kg/cm$^2$ (abs.) with the partial pressure of the inorganic gas being maintained at 0.4 to 1.1 kg/cm$^2$ (abs.) and the partial pressure of the volatile blowing agent at 0.8 to 1.6 kg/cm$^2$ (abs.).

BRIEF DESCRIPTION OF THE DRAWING

Attached is a FIGURE showing a flow diagram generally depicting the process steps described above, starting with the dispersion step, followed by the impregnating step, the pressure aging step and the molding step for molding the preformed articles.

DETAILED DESCRIPTION OF THE INVENTION

Examples of the polyolefin resin used in this invention are polyethylene, polypropylene, an ethylene/propylene copolymer, an ethylene/vinyl acetate copolymer, a mixture of at least two of the above polymers or copolymers, and a mixture of at least 50% of the above polyolefin resin with another resin.

Air, nitrogen, helium, neon, argon, etc. may be used, either singly or in combination, as the inorganic gas. Air is most economical and therefore preferred.

The volatile blowing agent used in this invention may be selected from aliphatic hydrocarbons, cycloaliphatic hydrocarbons, halogenated hydrocarbons, etc. which are gaseous or liquid in a normal condition and which are usually employed as organic blowing agents in the production of foams. Specific examples include aliphatic hydrocarbons such as propane, butane, and pentane, cycloaliphatic hydrocarbons such as cyclobutane and cyclopentane, and halogenated hydrocarbons such as trichlorofluoromethane, dichlorodifluoromethane, dichlorotetrafluoroethane, methyl chloride, ethyl chloride and methylene chloride. The halogenated hydrocarbons are preferred. These blowing agents may be used singly or in combination with each other.

It is essential that in the cells of the pre-foamed particles of a polyolefin resin to be filled in a mold, the partial pressure of the inorganic gas should be 0.4 to 1.1 kg/cm$^2$ (abs.), the partial pressure of the volatile blowing agent should be 0.8 to 1.6 kg/cm$^2$ (abs.), and the total pressure of the gaseous mixture should be 1.4 to 2.5 kg/cm$^2$ (abs.). If the total pressure of the gaseous mixture is lower than 1.4 kg/cm$^2$ (abs.), the resulting foamed article has large shrinkage. If the total pressure exceeds 2.5 kg/cm$^2$ (abs.), the resulting foamed article has a well adhered surface layer but an insufficiently adhered core portion. If the partial pressure of the inorganic gas is lower than 0.4 kg/cm$^2$ (abs.) or the partial pressure of the volatile blowing agent exceeds 1.6 kg/cm$^2$ (abs.), the resulting foamed article has large shrinkage even when the total pressure is within the range of 1.4 to 2.5 kg/cm$^2$ (abs.). On the other hand, if the partial pressure of the inorganic gas exceeds 1.1 kg/cm$^2$ (abs.) or the partial pressure of the volatile blowing agent is lower than 0.8 kg/cm$^2$ (abs.), a well adhered foamed article cannot be obtained from a base resin having a high softening temperature, nor can a foamed article having a large thickness be obtained. In other words, only when the partial pressure of the inorganic gas is 0.4 to 1.1 kg/cm$^2$ (abs.), the partial pressure of the volatile blowing agent is 0.8 to 1.6 kg/cm$^2$ (abs.), and the total pressure is 1.4 to 2.5 kg/cm$^2$ (abs.), a well adhered foamed article can be obtained which is substantially free from shrinkage irrespective of its thickness and the softening temperature of the base resin. For example, when low-density polyethylene (usually used in the crosslinked state) having a relatively low softening temperature is used as a base resin for pre-foamed particles, the process of the invention can give a foamed article well adhered even at its core portion whether its thickness is as small as 10 mm to 20 mm for example or as large as more than 50 mm for example. Furthermore, when polypropylene having a relatively high softening temperature is used, the process of the invention can give well adhered foamed article substantially free from shrinkage. It is not clear what this advantage of the invention is attributed to. Presumably, however, it is synergistically brought about by the action of the volatile blowing agent to promote adhesion by plasticizing the base resin, and the by-effect of preventing shrinkage, which may occur by dissipation of the volatile blowing agent from the foamed article, by limiting the partial pressures of the inorganic gas and the volatile blowing agent to optimal values.

Because of this advantage, the present invention also brings about the following secondary advantage. Specifically, good adhesion permits molding at relatively low temperature, and the time required for heating or cooling can be shortened. This leads to the great commercial advantage that the molding cycle can be shortened.

A general conventional method for producing pre-foamed particles involves the heating by steam on polyolefin resin particles containing a blowing agent. This method is disadvantageous in various respects. Since the time required for heating is relatively long, the blowing agent impregnated in the polyolefin resin particles dissipates during the course of pre-foaming and the efficiency of foaming is poor, thus rendering the method unsuitable for mass-production. Moreover, the expansion ratio is low and the resulting pre-foamed particles have poor performance. If a base resin having a high softening temperature is used, the foaming temperature should be maintained high, and therefore, pre-foamed particles having good quality are more difficult to obtain.

In contrast, according to the process for producing pre-foamed particles in accordance with this invention, the pre-foamed particles are produced by releasing the resin particles containing the volatile blowing agent together with water into a low-pressure atmosphere. Accordingly, foaming is carried out at a high speed and is completed within a very short period of time, and moreover, the speed of transfer of the foamed particles is high. Thus, the efficiency of foaming is very high and large quanities of pre-foamed particles can be obtained within short periods of time. Even when the blowing agent is incorporated in the same proportion as the resin particles, the process of this invention can give pre-foamed particles having a higher expansion ratio than the aforesaid prior method. Even when a resin having a high softening temperature is used, pre-foamed particles can be easily produced because the resin is heated in advance to a temperature suitable for foaming, while it is being dispersed in water in a closed vessel.

The pre-foamed particles used in this invention can be conveniently obtained by a process which comprises an impregnating step of dispersing a volatile blowing agent and polyolefin resin particles in water in a closed vessel, heating them to a temperature higher than the minimum temperature at which the particles soften (i.e., the softening point of the particles), to impregnate the volatile blowing agent in the particles; a pre-foaming step of maintaining the pressure of the inside of the vessel at a pressure higher than the vapor pressure of the blowing agent, opening one end of the vessel and releasing the particles and water simultaneously into an atmosphere kept at a lower pressure than the inside of the vessel; and an aging step of supplying the pre-foamed particles to a pressure-proof vessel and aging them under pressure with an inorganic gas or a gaseous mixture consisting of an inorganic gas and a volatile blowing agent.

The impregnating step is carried out usually by charging 100 parts by weight of polyolefin resin particles and 100 to 300 parts by weight, preferably 200 to 300 parts by weight, of water into a vessel, closing the vessel, introducing 5 to 50 parts by weight, preferably 8 to 35 parts by weight, of the volatile blowing agent into the closed vessel, and then heating the contents to a temperature above the softening temperature of the polyolefin resin.

The heating temperature in this step is kept within a temperature range which induces favorable pre-foaming without cell destruction by considering the properties of the polyolefin resin. For example, when the base resin is crosslinked low-density polyethylene, the heating temperature is usually 70° to 140° C. When the base resin is non-crosslinked polypropylene or an ethylene-propylene copolymer having an ethylene content of 5 to 15mole%, the heating temperature is usually 120° to 170° C.

The heating time is the one sufficient for the blowing agent to be impregnated in the resin particles. It is usually 30 minutes to 1 hour.

The heating in the impregnating step can be carried out by any known heating method used in the art.

After the impregnating step, the pre-foaming step is carried out. The inside of the closed vessel is maintained at a high pressure, and in this condition, one end of the vessel is opened to release the resin particles containing the blowing agent and water at a time into a low pressure atmosphere than the inside of the vessel to obtain the pre-foamed particles.

The vapor pressure of the blowing agent in the pre-foaming step in this invention denotes the vapor pressure of the volatile blowing agent which is impregnated in the polyolefin resin particles dispersed in water. This does not necessarily correspond with the vapor pressure of the volatile blowing agent which exists alone. Thus, the vapor pressure of the blowing agent in the pre-foaming step varies depending upon the degree of affinity between it and the polyolefin resin particles, the contents of the blowing agent and the polyolefin resin particles, the type of the blowing agent, etc.

The atmosphere into which the water and polyolefin resin particles containing the blowing agent are released simultaneously may be an atmosphere kept at a lower pressure than the inside of the vessel. Usually, atmospheric air is used.

In order to release the contents of the vessel into an outside atmosphere kept at a lower pressure than the inside of the vessel while maintaining the inside of the vessel at a higher pressure than the vapor pressure of the blowing agent, it is convenient to provide a releasing port at one end of the vessel below the water surface, open the releasing port thereby releasing the contents, and simultaneously force a pressurized gas such as nitrogen or air or pressurized steam into the vessel.

The pre-foamed particles containing the blowing agent gas are obtained in the above manner. These pre-foamed particles are still unsuitable for use in the production of a foamed article in accordance with this invention. They should be subjected to the subsequent pressurized aging step to adjust the composition of the gases in the cells.

The pressurized aging step can be conveniently carried out by putting the pre-foamed particles in a pressure-proof vessel before the volatile blowing agent dissipates from the particles after the pre-foaming step and pressurizing them for a predetermined period of time under a predetermined pressure using an inorganic gas or a mixture of it with a volatile blowing agent; or by first leaving the pre-foamed particles to stand in the atmospheric air to permit dissipation of the volatile blowing agent from the particles, then placing the particles in a pressure-proof vessel, and pressurizing them for a predetermined period of time under a predetermined pressure using a mixture of an inorganic gas and a volatile blowing agent. The former procedure is advantageous in industrial practice.

While the pressure of the gaseous mixture in the cells of the resulting pre-foamed particles is maintained such that the partial pressure of the inorganic gas is 0.4 to 1.1 kg/cm$^2$ (abs.), the partial pressure of the volatile blowing agent is 0.8 to 1.6 kg/cm$^2$ (abs.) and the total pressure of the gaseous mixture is 1.4 to 2.5 kg/cm$^2$ (abs.), the pre-foamed particles should be filled in a mold and heated to expand them. This results in a well adhered foamed article substantially free from shrinkage.

The total pressure of the gaseous mixture in the pre-foamed particles can be calculated in accordance with the following equation on the basis of the volume of the gaseous mixture dissipating from the pre-foamed particles which is measured by using a gas burette connected to a vessel containing the pre-foamed particles.

The partial pressure of the volatile blowing agent can be calculated after quantitative determination by gas chromatography.

The following examples illustrate the present more specifically.

EXAMPLES 1 TO 3 AND COMPARATIVE EXAMPLES 1 TO 3

One hundred parts by weight of crosslinked polyethylene particles having a gel content of 55%, 22 parts by weight of dichlorodifluoromethane and 219 parts by weight of water were charged into a vessel. With stirring, they were heated to 105° C. and maintained at this temperature for 1 hour. While maintaining the pressure of the inside of the vessel at about 28 kg/cm$^2$(G), one end of the vessel was opened to release the particles and water simultaneously into the atmospheric air to give pre-foamed particles having a bulk density of 0.036 g/cc. Immediately then, the particles were put in a pressure-proof tank, and pressurized under the various conditions shown in Table 1. Then, the particles were put in a hopper of a molding machine, and filled in a mold having a thickness of 90 mm, a width of 900 mm and a length of 1200 mm. They were molded under heat with steam at 0.8 kg/cm$^2$(G). The results are shown in Table 1.

TABLE 1

|  |  | Pressurizing conditions (20° C., 24 hrs.) | | Internal pressure of the resulting particles (kg/cm$^2$) | | | |
| --- | --- | --- | --- | --- | --- | --- | --- |
|  |  | Gas composition (mole ratio) | Pressure (kg/cm$^2$) | Partial pressure of air | Partial pressure of F-12 | Total pressure | Results |
| Example | 1 | Air alone | 2.7 | 1.0 | 0.8 | 1.8 | Good |
|  | 2 | Air:F-12 = 4:1 | 2.5 | 0.6 | 0.9 | 1.5 | Good |
|  | 3 | Air:F-12 = 1:1 | 2.5 | 0.4 | 1.2 | 1.6 | Good |
| Comparative Example | 1 | Air alone | 3.5 | 1.2 | 0.8 | 2.0 | Poor adhesion among the particles in the inside of the molded article |
|  | 2 | Air Alone | 5.7 | 1.9 | 0.8 | 2.7 | Poor adhesion among the particles in the inside of the molded article |
|  | 3 | Air alone | 1.5 | 0.5 | 0.8 | 1.3 | Large shrinkage of the molded article (about 8% shrinkage) |

$$\text{Total pressure} = \frac{V_{ob}\left(1 + \frac{t - t_{ob}}{273}\right)}{v - \frac{w}{d}} \text{ [atmospheres (abs.)]}$$

$V_{ob}$: the volume (cc) of the gas evolved from the pre-foamed particles, $t_{ob}$: the temperature (°C.) of the gas captured as above, t: the temperature (°C.) of the pre-foamed particles, v: the volume (cc) of the pre-foamed particles measured, w: the weight (g) of the pre-foamed particles measured, d: the density (g/cc) of the base resin.

EXAMPLES 4 TO 6 AND COMPARATIVE EXAMPLES 4 TO 6

One hundred parts by weight of non-crosslinked particles of an ethylene-propylene random copolymer containing 9 mole% of an ethylene content, 23 parts by weight of dichlorodifluoromethane and 250 parts by weight of water were charged into a vessel. With stirring, they were heated to 135° C., and maintained at this temperature for 1 hour. Then, one end of the vessel was opened while maintaining the pressure of the inside of the vessel at about 30 kg/cm$^2$(G), and the particles and water were simultaneously released into the atmospheric air to give pre-foamed particles having a bulk density of 0.016 g/cc. Immediately then, the particles were put in a pressure-proof tank, and pressurized under the various conditions shown in Table 2. The particles were then fed into a hopper of a molding machine, and filled in a mold having a thickness of 40 mm, a width of 400 mm and a length of 600 mm. They were molded under heat with steam at 4.0 kg/cm²(G). The results are shown in Table 2.

TABLE 2

|  |  | Pressurizing conditions (20° C., 24 hrs) | | Internal pressure of the resulting particles (kg/cm²) | | | |
|---|---|---|---|---|---|---|---|
|  |  | Gas composition (mole ratio) | Pressure (kg/cm²) | Partial pressure of air | Partial pressure of F-12 | Total pressure | Results |
| Example | 4 | Air:F-12 = 1:2 | 3.0 | 0.4 | 1.6 | 2.0 | Good |
|  | 5 | Air:F-12 = 1:1 | 3.5 | 0.9 | 1.5 | 2.4 | Good |
|  | 6 | Air:F-12 = 3:2 | 3.5 | 1.1 | 1.3 | 2.4 | Good |
| Comparative Example | 4 | Air:F-12 = 1:2 | 2.5 | 0.3 | 1.4 | 1.7 | Large shrinkage of the molded article |
|  | 5 | Air:F-12 = 1:2 | 3.5 | 0.5 | 1.7 | 2.2 | Large shrinkage of the molded article |
|  | 6 | Air:F-12 = 4:3 | 3.8 | 1.1 | 1.6 | 2.7 | Poor adhesion among the particles in the inside of the molded article |

EXAMPLE 7

One hundred parts by weight of crosslinked polyethylene resin particles having a gel content of 53%, 250 parts by weight of water, 18 parts of weight of dichlorodifluoromethane and 9 parts by weight of tetrafluorodichloroethane were charged into a vessel. With stirring, they were heated to 105° C. and maintained at this temperature for 1 hour. While maintaining the pressure of the inside of the vessel at about 28 kg/cm²(G), a valve fitted to the bottom of the vessel was opened to releace the particles and water together into the atmospheric air to give pre-foamed particles having a bulk density of 0.032 kg/cc. Immediately then, the pre-foamed particles were placed in a pressure-proof tank, and left to stand at room temperature in the air under 2.2 kg/cm²(G), for 24 hours, and then fed into a hopper of a molding machine. The inside pressure of the particles was 1.7 kg/cm²(abs.) in total (0.9 kg/cm²(abs.) of air, 0.5 kg/cm²(abs.) of dichlorodifluoromethane and 0.3 kg/cm²(abs.) of tetrafluorodichloroethane). The particles having the above internal pressure were filled in a mold having a thickness of 60 mm, a width of 700 mm and a length of 1200 mm, and molded under heat with steam at 0.8 kg/cm²(G). There was obtained a well adhered foamed article substantially free from shrinkage.

What we claim is:

1. In a process for producing a foamed article of a polyolefin resin which comprises filling in a mold pre-foamed particles of a polyolefin resin containing a gaseous mixture consisting of an inorganic gas and a volatile organic blowing agent in their cells and heating them with steam to mold a foamed article; the improvement wherein the pre-foamed particles of the resin are those in which the total pressure of the gaseous mixture is 1.4 to 2.5 kg/cm² (abs.), with the partial pressure of the inorganic gas being maintained at 0.4 to 1.1 kg/cm² (abs.) and the partial pressure of the volatile blowing agent at 0.8 to 1.6 kg/cm² (abs.).

2. The process of claim 1 wherein the pre-foamed particles are prepared by dispersing the volatile blowing agent and the polyolefin resin particles in water in a closed vessel, heating them to a temperature above the softening temperature of the resin particles to impregnate the volatile blowing agent in the resin particles, thereafter maintaining the pressure of the inside of the vessel above the vapor pressure of said blowing agent, opening one end of the vessel to release the particles and water simultaneously therefrom into a low pressure atmosphere than the inside of the vessel to obtain pre-foamed particles, placing the pre-foamed particles in a pressure-proof vessel and aging them under pressure with an inorganic gas or a mixture of it with a volatile blowing agent.

3. The process of claim 1 wherein the polyolefin resin is polyethylene, polypropylene, an ethylene-propylene copolymer, an ethylene-vinyl acetate copolymer, a mixture of at least two of the above polymers or copolymers, or a mixture of at least 50% of the above polyolefin resin with another resin.

4. The process of claim 1 wherein the polyolefin resin is crosslinked polyethylene.

5. The process of claim 1 wherein the polyolefin resin is non-crosslinked polypropylene.

6. The process of claim 1 wherein the volatile organic blowing agent is at least one member selected from the group consisting of trichlorofluoromethane, dichlorodifluoromethane and dichlorotetrachloroethane.

* * * * *